Dec. 22, 1964    F. L. CHRISTENSEN    3,162,187
DIAMOND SAW BLADES
Filed Dec. 11, 1961    3 Sheets-Sheet 1
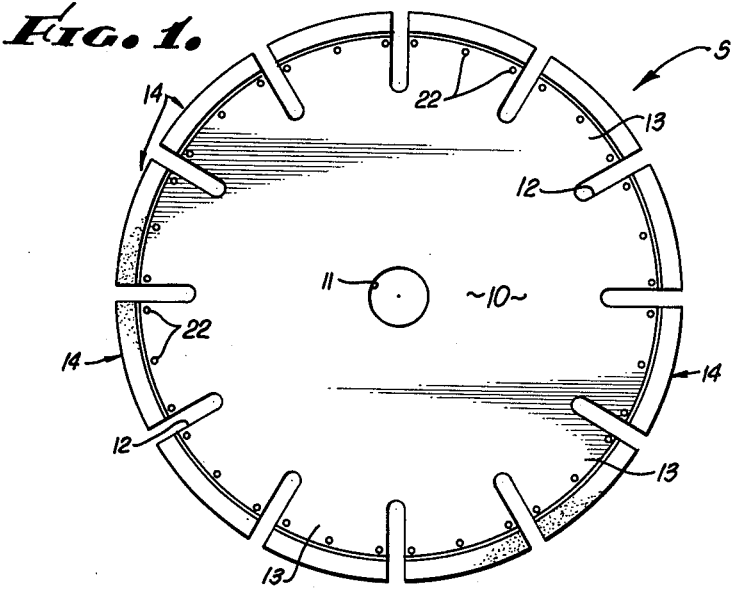
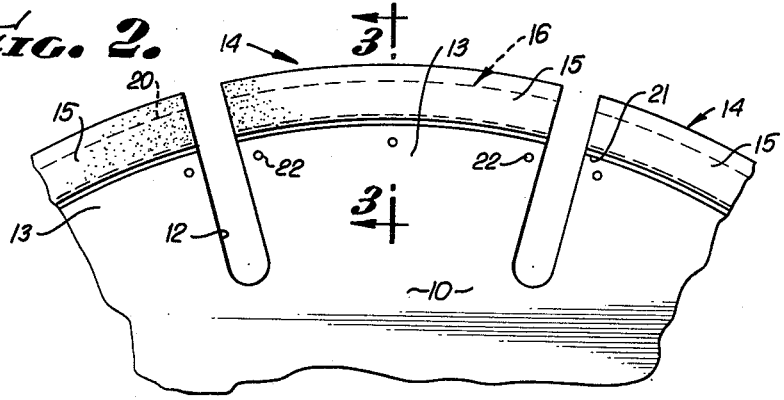
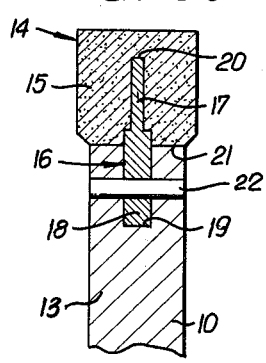
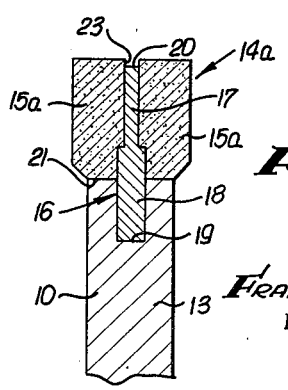
INVENTOR.
FRANK L. CHRISTENSEN
BY
Bernard Kriegel
ATTORNEY.

Dec. 22, 1964 F. L. CHRISTENSEN 3,162,187
DIAMOND SAW BLADES
Filed Dec. 11, 1961 3 Sheets-Sheet 2
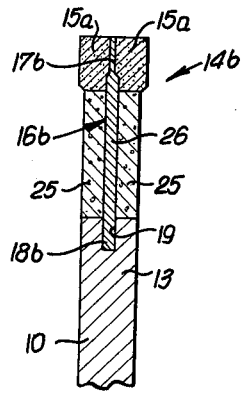
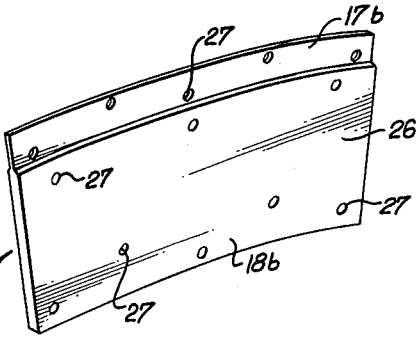
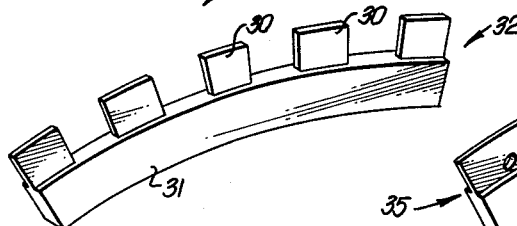
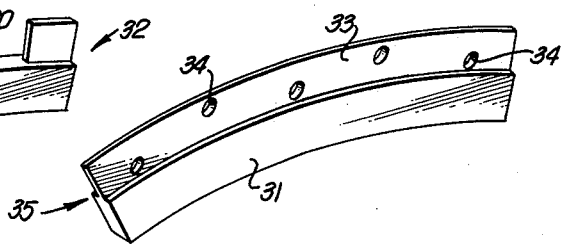
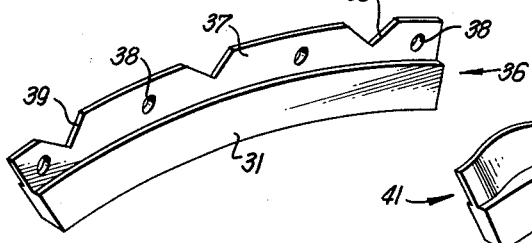
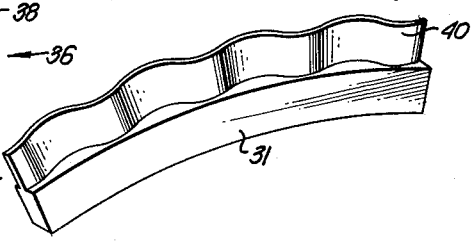
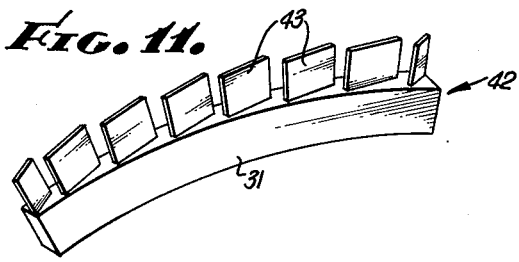
INVENTOR.
FRANK L. CHRISTENSEN
BY
Bernard Kriegel
ATTORNEYS.

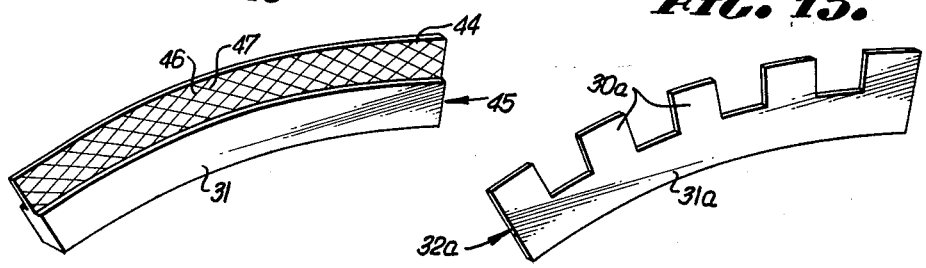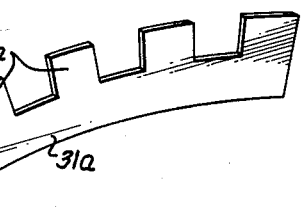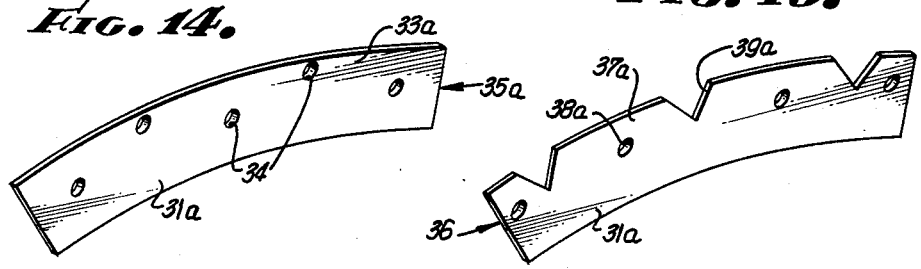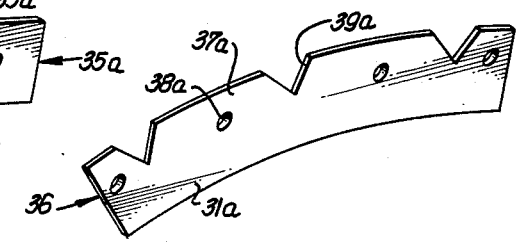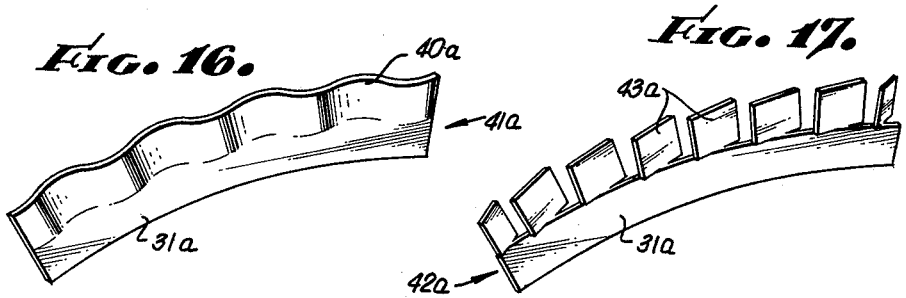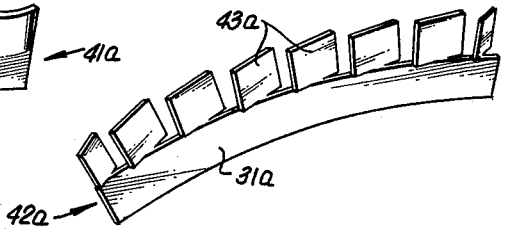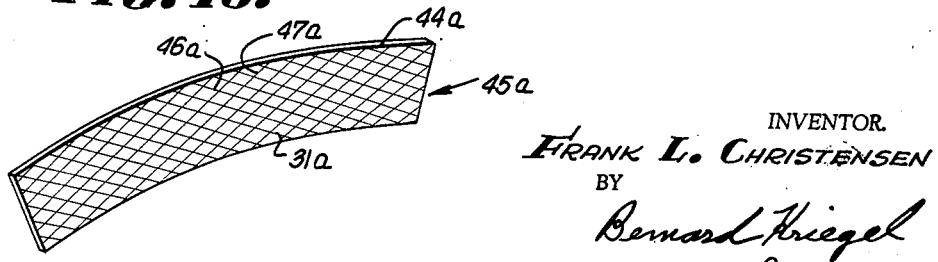

United States Patent Office

3,162,187
Patented Dec. 22, 1964

3,162,187
DIAMOND SAW BLADES
Frank L. Christensen, Salt Lake City, Utah, assignor to Christensen Diamond Products Company, Salt Lake City, Utah, a corporation of Utah
Filed Dec. 11, 1961, Ser. No. 158,243
21 Claims. (Cl. 125—15)

The present invention relates to cutting devices, and more particularly to saws and the like for cutting concrete, marble, tile, bricks, slate, granite, and a wide variety of other materials.

Rotary saw blades or discs embodying diamond impregnated segments brazed to their peripheral or rim portions have been used for cutting concrete and similar lapideous-like materials. Failures have resulted because of the relatively small area of the brazed joint between the segments and the steel discs or center to which the segments are secured, due to the use of a brazed butt joint. The brazing joint has also been subjected to overheating during operation of the saw blade, causing softening of the brazed joint and loss of diamonds, as well as breaking off of diamond impregnated segments. Such overheating also facilitates undercutting of the brazed joints by abrasive cutting particles, reducing the bonding area between the segments and the steel disc and resulting in premature saw failure due to pulling off and the other loss of diamond impregnated sections from the steel disc.

An object of the present invention is to provide a saw blade or disc having abrasive cutting segments, such as diamond impregnated segments, more firmly secured to the central support of the blade or disc, as by brazing them to the latter over a much greater bonding area than previously used. In fact, saw blades embodying the present invention have three to five times the total brazing area of a corresponding butt brazed joint heretofore used.

Another object of the invention is to prevent overheating of the brazed joint between abrasive cutting segments and the central support to which they are secured by displacing substantial areas of the brazed joints from a region of immediate adjaceny to the work being cut, and also by placing the brazed joints at locations where they can be more easily and evenly cooled by the cooling water.

Yet another object of the invention is to provide a saw blade or disc having abrasive cutting segments, such as diamond impregnated segments, which are substantially reinforced, as by bonding them to steel inserts, the latter than being brazed to the central portion of the disc, the resulting blade or disc being much stronger and capable of withstanding much higher operating temperatures without loss of diamonds or breaking off of segments.

A further object of the invention is to provide a rotatable saw blade or disc embodying abrasive cutting segments brazed to the central portion of the disc, the joints or connections between the segments and the central disc portion having greater resistance to failure caused by side pressures, such as pressures resulting from saw overload, blade flutter, and absence of tracking in the groove cut in the work.

An additional object of the invention is to provide a rotary saw blade or disc having abrasive cutting segments, such as diamond impregnated segments, secured to the central portion of the blade or disc, in which loss or breakage segments is greatly reduced due to forces acting thereon in a circumferential or tangential direction, in a lateral direction, or in a radial direction.

Another object of the invention is to provide a saw blade in which assurance is had that diamond impregnated or similar segments are positively centered in the central portion of the blade.

A further object of the invention is to provide a rotary saw blade having diamond impregnated segments, or the like, secured to its central portion, and in which the blade has improved wear resistance on its side portions inwardly of the segments, thereby greatly increasing the life of the blade.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURE 1 is a plan view of a diamond cutting wheel or saw;

FIG. 2 is a plan view of a portion of the cutting wheel or saw of FIG. 1, on an enlarged scale;

FIG. 3 is a section taken along the line 3—3 on FIG. 2;

FIG. 4 is a generally radial section similar to FIG. 3 of another embodiment of the invention;

FIG. 5 is a view similar to FIG. 3 of still another form of the invention;

FIG. 6 is an isometric projection of a reinforcing member forming part of the combination disclosed in FIG. 5;

FIGS. 7 to 18, inclusive, are isometric views of different specific forms of reinforcing members to which diamond impregnated segments may be secured, and which can, in turn, be secured to the central portion of the cutting wheel or saw illustrated in FIG. 1.

In the form of invention illustrated in FIGS. 1, 2 and 3, a cutting wheel, saw or blade S is provided which is capable of effectively cutting concrete, marble, tile and similar types of materials. The saw or blade includes a central support or disc 10, which is usually made of steel, having a central arbor hole 11 for mounting the wheel on a suitable rotatable mechanism (not shown). The disc or support 10 has a plurality of uniformly spaced radial slots 12 extending inwardly from its periphery, which provide lands 13 between the slots to which the cutting segments or members 14 are secured. Each cutting segment or member includes an arcuate section of a metallic matrix 15, such as tungsten or tungsten carbide of a suitable mesh, impregnated with diamonds of a suitable mesh, such abrasive cutting sections being attached to a central reinforcing arcuate section 16.

As disclosed in FIGS. 1, 2 and 3, the diamond impregnated matrix 15 is uniformly disposed on opposite sides of the outer anchor portion 17 of the central reinforcing member 16, an inner tongue portion 18 projecting inwardly from the diamond impregnated matrix 15 for reception within a companion peripheral or circumferential groove 19 formed in the outer or rim portion of the central support or disc 10. Each cutting segment 14 may be formed by placing the steel insert reinforcing piece 16 centrally in a suitable mold (not shown), the diamond impregnated matrix material 15 being loaded on both sides thereof. This assembly is then placed in a furnace for a proper period of time, known in the art, which firmly bonds each matrix particle and diamond or stone to each other, as well as to each side of the steel insert reinforcing section 17. Typically, the furnace bonding operation is performed at a furnacing temperature of from about 2150° F. to about 2400° F. As shown in FIG. 3, each diamond impregnated matrix section 15 is, in effect, a single structure, which not only is disposed on opposite sides of the outer anchor portion 17 of the central reinforcing member 16, but also across the outer periphery 20 of the reinforcing section 17. Because of furnace bonding the diamond impregnated matrix section 15 to the central reinforcing section 17, and in view of the use of a proper mold, assurance is had that the reinforcing section is disposed centrally of the diamond impregnated matrix section 15, and is, in effect, inseparably united thereto.

Each cutting segment or member 14 has an arcuate extent substantially equalling that of an arcuate land 13, and is placed on the land with its inner tongue portion 18 received in the groove 19. The depth of the groove corresponds to the inward extent of the tongue portion 18 from the diamond impregnated matrix section 15, and the width of the groove 19 corresponds to the thickness of the tongue portion 18. The tongue 18 is then brazed to the central support or disc 10 across the full area of the sides of the groove 19, as well as long the entire bottom of the groove. Typically, brazing would be performed at a temperature not exceeding 1800° F. The brazed joint may also be provided between the inner surface 21 of the diamond impregnated section 15 and the companion perimeter of the disc 10 on opposite sides of the groove 19. It is to be noted that the diamond impregnated matrix section 15 is wider than the thickness of the central support or disc 10, so that the cutting section will cut a wider groove in the work than the thickness of the central support or disc.

With a rotatable cutting wheel or saw blade S disclosed in FIGS. 1, 2 and 3, the brazing area between the tongue 18 and groove 19 is much greater than the area that would be provided in a brazed butt joint, such as the brazing of a diamond impregnated segment to the periphery only of the central support 10. In fact, the brazing area of the tongue and groove joint 18, 19 illustrated in FIG. 3 is three to five times the brazing area of a butt joint. As a result, the strength of the brazed joint shown in FIG. 3 is several times the strength of the butt joint, thereby providing great resistance to brazed joint failure. In addition, the central reinforcing section 16 greatly strengths the diamond impregnated matrix section 15 against loads imposed upon it from a variety of directions. The reinforcing members 16 resist side pressures which are caused by overloading the saw, fluttering occurring in the blade S, or the lack of tracking of the rotating blade in the work groove which it is cutting. Such side pressures are further greatly resisted by the fact that the tongue 18 is disposed in the groove 19, the side loading being transmitted from the diamond impregnated matrix section 15 to the central reinforcing section 16, and from the latter to the sides of the grooves 19.

With the arrangement described, the brazed areas are removed to a substantial extent from the matrix sections themselves. In the event of overheating of the latter in cutting into the work, the heat is not transmitted to as great an extent into the tongue and groove brazed joint. As a matter of fact, since the brazing area is disposed substantially inwardly of the diamond impregnated matrix section 15, cooling water caused to flow upon the saw blade S can readily cool the sides of the latter and also insure the cooling of the brazed joint existing along the sides and inner portions of the tongue 18 and groove 19. As the result of preventing overheating of the brazed joint, it does not soften or become plastic, which might allow the diamond impregnated matrix sections 14 to pull loose from the central support 10. Moreover, the brazed joint is disposed inwardly of the sides of the central support, or away from any abrasive particles resulting from the cutting action, which might act upon the juncture between the diamond impregnated matrix section 15 and the central support 10. Such abrasive cutting particles have heretofore undercut a brazed joint, reducing its area, and causing the diamond impregnated sections to pull away from the central support.

If desired, as shown in FIGS. 1, 2 and 3, the cutting segments or members 14 can be further secured to the central support or disc 10, as by means of rivets 22 passing through the outer margin of the central support 10 and through the tongues 18.

As disclosed in FIG. 3, each diamond impregnated matrix section 15 is a single member extending across the outer end 20 of the central reinforcing section 16, as well as on both sides thereof. Thus, the diamond impregnated matrix section cuts over the entire width of the groove formed in the work. The form of invention illustrated in FIG. 4 is essentially the same as that shown in FIG. 3, except that a double matrix 15a, 15a is used. Thus, a separate diamond impregnated matrix section 15a is bonded to opposite sides of the outer anchor portion 17 of the reinforcing section 16, as by means of the furnacing operation described above. There is no diamond impregnated matrix material outwardly of the outer anchor portion 20, leaving a gap 23 between the diamond impregnated matrix sections 15a, 15a.

The structure illustrated in FIG. 4 possessess all of the advantages of the one illustrated in FIG. 3. By leaving the central gap 23 between the matrix sections, the outer surface cutting area of diamond impregnated matrix sections against the base of the groove formed in the work is reduced, and such reduction can be quite extensive, as, for example, of the order of approximately twenty-five percent (25%) less than that of the diamond impregnated matrix section area illustrated in FIG. 3. This reduces the surface cutting area against the work and increases the unit pressure, causing the blade to cut more rapidly.

The form illustrated in FIG. 4 is also capable of ready heat dissipation. The cooling water engaging the central support or disc 10 will contact the latter on opposite sides of the groove region 19 and readily remove heat from the tongue portion 18 and the tongue and grooved brazed joint as well, preventing overheating and also preventing the diamond sections 14a from pulling loose from the central support or disc 10.

The form of invention disclosed in FIGS. 5 and 6 is the same general combination as in FIGS. 1 and 4. However, provision is made for enhancing the wear resistance of the central support or disc 10 adjacent to and immediately inwardly of the diamond impregnated matrix sections 15a, 15a, which region is subject to the abrading action of the particles produced in the work being cut. As shown, the peripheral groove 19 is cut in the central support or disc 10, which has a lesser diameter than the corresponding support or disc shown in FIG. 4. Each cutting segment or member 14b includes the central reinforcing section 16b that has the diamond impregnated matrix section 15a bonded to opposite sides of its outer portion 17b. The central reinforcing member 16b extends inwardly to a much greater extent than disclosed in FIG. 4, its inner portion 18b constituting the tongue received within the peripheral or circumferential groove 19 in the land 13, where it is bonded by the brazing of the sides and inner ends of the tongue 18b to the companion sides and bottom of the groove 19. Tungsten carbide particles 25 are bonded to each other and to the sides of the central reinforcing section 26 between the diamond impregnated matrix sections 15a and the tongue 18b. Each section of the tungsten carbide matrix 25 has its outer surface lying in the same plane as the outer side surfaces of the central support or disc 10. If desired, the central reinforcing member 16b may have holes 27 therethrough through which the matrix material 15a, 25 can pass to intergate the matrix sections on opposite sides of the central reinforcing member 16b to each other. The innermost row of holes may receive the rivets 22 for additionally securing each cutting segment or member 14b to the central support or disc 10.

As a diamond saw blade constructed as illustrated in FIGS. 5 and 6 cuts into the work, any abrasive particles will engage the wear resisting tungsten carbide matrices 25 on opposite sides of the central reinforcing member 16b, which have greater resistance to abrasion and wear than the steel of which the central support or disc 10 is made. As a result, the saw blade has a much longer life.

In FIGS. 7 to 18, inclusive, different forms of central reinforcing sections are disclosed, to which the diamond impregnated matrix sections 15 or 15a are to be bonded, and which are to be received in the peripheral or circumferential groove 19 formed centrally in the support or disc 10. As disclosed in FIG. 7, the outer anchor portion 30 is thinner than the inner tongue portion 31, the outer portion being of castellated form to provide the circumferentially spaced rib segments 30. The diamond impregnated matrix material will be bonded to the opposite sides of the rib segments 30 and will also be present between the rib segments to intergate the matrix material on one side of the anchor portion 30 to the matrix material on the opposite side of the segment. This arrangement provides all of the advantages of the device illustrated in FIGS. 1 to 4, but additionally results in a resistance to circumferential displacement of the diamond impregnated segments relative to the reinforcing section 32, because of the positive interlock between the diamond abrasive segments and the rib segments 30.

The foregoing result is also achieved in the form 35 of invention illustrated in FIG. 8, in which the outer anchor portion or rib 33 has rows of holes 34 extending therethrough, one row of holes being staggered relative to another row of holes. The diamond impregnated matrix section or sections will not only be bonded to opposite sides of the rib 33, but the matrix material will also pass through the holes 34 to integrate the matrix material on one side of the rib 33 to the matrix material on the other side of the rib. Here again, the circumferential displacement of the diamond impregnated sections relative to the rib 33 is prevented. Due to the matrix material extending through the holes 34, radial outward movement of the diamond impregnated matrix sections is also resisted, such as might result from centrifugal force.

In the form of invention disclosed in FIG. 9, the central reinforcing section 36 has its outer anchor portion 37 provided with a row of holes 38 and also with notches 39, such as V-shaped notches, opening through its outer perimeter. The bonding of the diamond impregnated matrix sections to opposite sides of the central anchor portion or rib 37 will be accompanied by matrix material extending through the holes 38 and also filling the notches 39, integrating the matrix material on one side of the rib with the matrix material on the opposite side of the rib. Again, circumferential and centrifugal movement of the diamond impregnated sections relative to the central reinforcing section 36 is prevented. The matrix material in the V-shaped notches 39 further increases the resistance to circumferential travel of the diamond impregnated sections along the central rib or anchor portion 37.

In the form of invention disclosed in FIG. 10, the outer anchor portion 40 of the central reinforcing section 41 is made of a wave form, shifting alternately from one side to the other of a central plane of the reinforcing section 41. The diamond impregnated matrix sections are bonded to opposite sides of the rib 40 of wave form, the undulating rib providing corresponding undulations in the matrix sections, and, therefore, interlocking the matrix section to the rib 40 against relative circumferential movement, as well as increasing the bonding surface or area between the matrices and the rib 40 relative to the area present with a straight rib or outer anchor portion.

In the form of invention disclosed in FIG. 11, the central reinforcing section 42 is constituted by a plurality of rib segments 43 that are angled relative to the central plane of the reinforcing section. The diamond impregnated matrix material will be disposed on opposite sides of the angled rib segments 43 at least to their outer ends, the matrix material also being present between the rib segments so as to integrate the matrix material on one side of the anchor portion 43 to the matrix material on the other side of the outer anchor portion. The diamond impregnated matrix resulting from the use of the central reinforcing section, illustrated in FIG. 11, will insure the presence of matrix material across the entire width of the groove being cut in the work, without the necessity for the matrix extending outwardly beyond the ends of the angled rib segments 43. With the angled rib segments, the diamond impregnated matrix section is securely bonded to the anchor portion against relative circumferential movement with respect thereto, since it interlocks with the angled rib sections 43.

In FIG. 12, the anchor portion 44 of the reinforcing section 45 has its sides made with intersecting grooves 46, 47 so as to provide crossing ribs. The bonding of diamond impregnated matrix material to opposite sides of the outer anchor portion 44 will result in matrix material being disposed within the grooves 46, 47 between the crossing ribs. Such an arrangement not only securely anchors the diamond impregnated sections to the anchor portion 44 against circumferential movement with respect thereto, but also resists its outward movement with respect thereto under the action of centrifugal force.

The forms of invention illustrated in FIGS. 13, 14, 15, 16, 17 and 18 correspond to FIGS. 7, 8, 9, 10, 11 and 12, respectively. Like parts have the letter "a" added thereto. The essential difference is that the inner tongue portion 31a has substantially the same thickness of the material as the outer anchor portion. As disclosed in FIGS. 1 to 12, inclusive, the inner tongue portion 31 of each device has a greater thickness than the outer anchor portion of the same device, the inner tongue portion having substantial strength and better capable of resisting lateral deflection. In the forms of invention disclosed in FIGS. 13 to 18, inclusive, the inner tongue portions 31a will fit within narrower companion grooves in the disc 10, to the walls of which they will be secured by brazing. In all other respects, the matrix material is secured to the outer anchor portions of the central reinforcing sections illustrated in FIGS. 13 to 18, inclusive, in substantially the same manner as in FIGS. 7 to 12, inclusive, respectively.

I claim:

1. In an abrasive cutting device: a supporting disc having a peripheral groove; cutting segments disposed around said disc, each segment comprising a central reinforcing section having an inner tongue portion secured within said groove and brazed to the sides and bottom thereof and an outer predominantly imperforate anchor portion extending outwardly of the periphery of said disc, and one or more abrasive sections furnace bonded to the opposite sides of said anchor portion and extending axially beyond the sides of said disc.

2. In an abrasive cutting device: a supporting disc having a peripheral groove; cutting segments disposed around said disc, each segment comprising a central reinforcing section having an inner tongue portion within said groove and brazed to the sides and bottom thereof and an outer predominantly imperforate anchor portion extending outwardly of said groove, and one or more diamond impregnated matrix sections furnace bonded to the opposite sides of said anchor portion.

3. In an abrasive cutting device: a supporting disc having a peripheral groove; cutting segments disposed around said disc, each segment comprising a central reinforcing section having an inner tongue portion within said groove and brazed to the sides and bottom thereof and an outer predominantly imperforate anchor portion extending outwardly of said groove, and diamond impregnated matrix sections furnace bonded to opposite sides of said anchor portion, the outer portions of said matrix sections being axially spaced from each other.

4. In an abrasive cutting device: a supporting disc having a peripheral groove; cutting segments disposed around said disc, each segment comprising a central reinforcing section having an inner tongue portion within said groove and brazed to the sides and bottom thereof and an outer predominantly imperforate anchor portion extending outwardly of said groove, and a diamond impregnated matrix section furnace bonded to the opposite sides of said anchor portion and extending across the outer end of said anchor portion.

5. In an abrasive cutting device: a supporting disc having a peripheral groove; cutting segments disposed around said disc, each segment comprising a central reinforcing section having an inner tongue portion secured within said groove and brazed to the sides and bottom thereof and an outer predominantly imperforate anchor portion extending outwardly of the periphery of said disc, and abrasive sections furnace bonded to opposite sides of said anchor portion, the outer portion of said abrasive sections being axially spaced from each other.

6. In an abrasive cutting device: a supporting disc having a peripheral groove; cutting segments disposed around said disc, each segment comprising a central reinforcing section having an inner tongue portion secured within said groove and brazed to the sides and bottom thereof and an outer predominantly imperforate anchor portion extending outwardly of the periphery of said disc, and an abrasive section furnace bonded to opposite sides of said anchor portion and extending across the outer end of said anchor portion.

7. In an abrasive cutting device: a supporting disc having a peripheral groove; cutting segments disposed around said disc, each segment comprising a central reinforcing section having an inner tongue portion secured within said groove and bonded to the sides and bottom thereof and an outer anchor portion extending outwardly of the periphery of said disc, one or more abrasive sections bonded to said anchor portion and extending axially beyond the sides of said disc, and hardfacing material bonded to opposite sides of said reinforcing section between said tongue portion and anchor portion, the outer side surfaces of said hardfacing material being coplanar with the sides of said disc.

8. In an abrasive cutting device: a supporting disc having a peripheral groove; cutting segments disposed around said disc, each segment comprising a central reinforcing section having an inner tongue portion within said groove and brazed to the sides and bottom thereof and an outer anchor portion extending outwardly of said groove, one or more diamond impregnated matrix sections bonded to the opposite sides of said anchor portion, and hardfacing material bonded to opposite sides of said reinforcing section between said tongue portion and anchor portion, the outer side surfaces of said hardfacing material being coplanar with the sides of said disc.

9. In an abrasive cutting device: a supporting disc having a peripheral groove extending radially inwardly thereof and circumferentially spaced radial slots providing lands between said slots; arcuate cutting segments carried by said lands; each segment comprising an arcuate reinforcing section having an inner tongue portion secured within the groove of its companion land and brazed to the sides and bottom of said groove and an outer arcuate predominantly imperforate anchor portion disposed outwardly of said groove; and one or more arcuate abrasive sections furnace bonded to the opposite sides of said anchor portion and extending axially beyond the sides of said disc.

10. In an abrasive cutting device: a supporting disc having a peripheral groove extending radially inwardly thereof and circumferentially spaced radial slots providing lands between said slots; arcuate cutting segments carried by said lands; each segment comprising an arcuate reinforcing section having an inner tongue portion within said groove and brazed to the sides and bottom thereof and an outer arcuate predominantly imperforate anchor portion extending outwardly of said groove, and one or more diamond impregnated matrix sections furnace bonded to the opposite sides of said anchor portion.

11. In an abrasive cutting device: a supporting disc having a peripheral groove extending radially inwardly thereof and circumferentially spaced radial slots providing lands between said slots; arcuate cutting segments carried by said lands; each segment comprising an arcuate reinforcing section having an inner tongue portion secured within the groove of its companion land and bonded to the sides and bottom of said groove and an outer arcuate anchor portion disposed outwardly of said groove; one or more arcuate abrasive sections bonded to said anchor portion and extending axially beyond the sides of said disc, and hardfacing material bonded to opposite sides of said reinforcing section between said tongue portion and anchor portion, the outer side surfaces of said hardfacing material being coplanar with the sides of said disc.

12. In an abrasive cutting device: a supporting disc having a peripheral groove; cutting segments disposed around said disc, each segment comprising a central reinforcing section having an inner tongue portion secured within said groove and brazed to the sides and bottom of said groove and an outer anchor portion extending outwardly of the periphery of said disc, and one or more abrasive sections furnace bonded to the opposite sides of said anchor portion and extending axially beyond the sides of said disc, said anchor portion having openings therethrough, portions of said abrasive sections extending through said openings.

13. In an abrasive cutting device: a supporting disc having a peripheral groove; cutting segments disposed around said disc, each segment comprising a central reinforcing section having an inner tongue portion within said groove and brazed to the sides and bottom thereof and an outer predominantly imperforate anchor portion extending outwardly of said groove, and one or more diamond impregnated matrix sections furnace bonded to the opposite sides of said anchor portion, a minor portion of said anchor portion having openings therethrough receiving impregnated matrix material of said diamond impregnated matrix sections to integrate said sections on opposite sides of said anchor portion.

14. In an abrasive cutting device: a supporting disc having a peripheral groove; cutting segments disposed around said disc, each segment comprising a central reinforcing section having an inner tongue portion secured within said groove and brazed to the sides and bottom thereof and an outer predominantly imperforate anchor portion extending outwardly of the periphery of said disc, and one or more abrasive sections furnace bonded to the sides of said anchor portion and extending axially beyond the sides of said disc, said anchor portion being of wave form in a direction circumferentially of said anchor portion.

15. In an abrasive cutting device: a supporting disc having a peripheral groove; cutting segments disposed around said disc, each segment comprising a central reinforcing section having an inner tongue portion secured within said groove and brazed to the sides and bottom thereof and an outer substantially entirely imperforate anchor portion extending outwardly of the periphery of said disc, and one or more abrasive sections furnace bonded to the sides of said anchor portion and extending axially beyond the sides of said disc, said anchor portion having cross ribs on its opposite sides meshing with companion cross ribs in said abrasive sections.

16. In an abrasive cutting device: a supporting disc having a peripheral groove; cutting segments disposed around said disc, each segment comprising a central reinforcing section having an inner tongue portion secured within said groove and brazed to the sides and bottom thereof and an outer anchor portion extending outwardly of the periphery of said disc, and one or more abrasive sections furnace bonded to the sides of said anchor portion and extending axially beyond the sides of said disc, said anchor portion including circumferentially spaced segments.

17. In an abrasive cutting device: a supporting disc having a peripheral groove; cutting segments disposed around said disc, each segment comprising a central reinforcing section having an inner tongue portion secured within said groove and brazed to the sides and bottom thereof and an outer anchor portion extending outwardly of the periphery of said disc, and one or more abrasive sections furnace bonded to the sides of said anchor portion and extending axially beyond the sides of said disc, said anchor portion including circumferentially spaced segments inclined to the plane of said tongue portion.

18. In an abrasive cutting device: a supporting disc having a peripheral groove; cutting segments disposed around said disc, each segment comprising a central reinforcing section having an inner tongue portion secured within said groove and brazed to the sides and bottom thereof and an outer predominantly imperforate anchor portion extending outwardly of the periphery of said disc, and one or more abrasive sections furnace bonded to the sides of said anchor portion and brazed to the periphery of said disc on opposite sides of said groove and extending axially beyond the sides of said disc.

19. In an abrasive cutting device: a one-piece supporting disc having a peripheral groove; cutting segments disposed around said disc, each segment comprising a central reinforcing section having an inner tongue portion secured within said groove and brazed to the sides and bottom thereof and an outer predominantly imperforate anchor portion extending outwardly of the periphery of said disc, and one or more abrasive sections furnace bonded to the sides of said anchor portion and extending axially beyond the sides of said disc.

20. In an abrasive cutting device: a supporting disc having a peripheral groove extending radially inwardly thereof and circumferentially spaced radial slots providing lands between said slots; arcuate cutting segments carried by said lands; each segment comprising an arcuate reinforcing section having an inner tongue portion secured within the groove of its companion land and brazed to the sides and bottom of said groove and an outer arcuate predominantly imperforate anchor portion disposed outwardly of said groove; and one or more arcuate abrasive sections furnace bonded to the sides of said anchor portion and brazed to the periphery of said disc on opposite sides of said groove and extending axially beyond the sides of said disc.

21. In an abrasive cutting device: a one-piece supporting disc having a peripheral groove extending radially inwardly thereof and circumferentially spaced radial slots providing lands between said slots; arcuate cutting segments carried by said lands; each segment comprising an arcuate reinforcing section having an inner tongue portion secured within the groove of its companion land and brazed to the sides and bottom of said groove and an outer arcuate predominantly imperforate anchor portion disposed outwardly of said groove; and one or more arcuate abrasive sections furnace bonded to the sides of said anchor portion and brazed to the periphery of said disc on opposite sides of said groove and extending axially beyond the sides of said disc.

References Cited in the file of this patent

UNITED STATES PATENTS

| | | |
|---|---|---|
| 163,880 | Morrison | June 1, 1875 |
| 172,337 | Morrison | Jan. 18, 1876 |
| 237,472 | Blackburn | Feb. 8, 1881 |
| 1,634,708 | Chayes | July 1, 1927 |
| 1,989,074 | Bullard | Jan. 29, 1935 |
| 2,351,129 | Jockel | June 13, 1944 |
| 2,811,960 | Fessel | Nov. 5, 1957 |
| 3,016,661 | Nielsen | Jan. 16, 1962 |
| 3,028,710 | Pratt | Apr. 10, 1962 |
| 3,048,160 | Griffin et al. | Aug. 7, 1962 |

FOREIGN PATENTS

| | | |
|---|---|---|
| 1,026,618 | France | Apr. 26, 1953 |
| 1,087,078 | France | Aug. 18, 1954 |